United States Patent [19]

Upchurch et al.

[11] Patent Number: 4,991,181
[45] Date of Patent: Feb. 5, 1991

[54] CATALYST FOR CARBON MONOXIDE OXIDATION

[75] Inventors: Billy T. Upchurch, Virginia Beach; Irvin M. Miller, Newport News; David R. Brown, Norfolk; Patricia P. Davis, Newport News; David R. Schryer, Hampton; Kenneth G. Brown, Virginia Beach; John D. Van Norman, Norfolk, all of Va.

[73] Assignee: The United States of America as represented by the Administrator of the National Aeronautics and Space Administration, Washington, D.C.

[21] Appl. No.: 443,406

[22] Filed: Nov. 30, 1989

Related U.S. Application Data

[62] Division of Ser. No. 298,150, Jan. 18, 1989.

[51] Int. Cl.$^5$ .............................................. H01S 3/22
[52] U.S. Cl. .................................... 372/59; 423/247; 502/34; 502/324
[58] Field of Search .................... 372/59; 502/34, 333, 502/324, 328; 423/247

[56] References Cited

U.S. PATENT DOCUMENTS

| 4,524,051 | 6/1985 | Wright et al. | 502/333 |
| 4,639,432 | 1/1987 | Holt et al. | 502/324 |
| 4,808,394 | 2/1989 | Kolts et al. | 502/328 |
| 4,818,745 | 4/1989 | Kolts | 502/328 |
| 4,829,035 | 5/1989 | Upchurch | 502/34 |
| 4,868,841 | 9/1989 | Affleck et al. | 372/59 |

*Primary Examiner*—Léon Scott, Jr.
*Attorney, Agent, or Firm*—George F. Helfrich; Harold W. Adams; John R. Manning

[57] ABSTRACT

A catalyst for the combination of CO and $O_2$ to form $CO_2$ which includes a platinum group metal—e.g., platinum; a reducible metal oxide having multiple valence states—e.g., $SnO_2$; and a compound which can bind water to its structure—e.g., silica gel. This catalyst is ideally suited for application to high-powered, pulsed, $CO_2$ lasers operating in a sealed or closed-cycle condition.

7 Claims, No Drawings

CATALYST FOR CARBON MONOXIDE OXIDATION

This is a division of application Ser. No. 07/298,150, filed Jan. 18, 1989.

BACKGROUND OF THE INVENTION

1. Field of the Invention

This invention relates generally to a catalyst for the combination of CO and $O_2$ to form $CO_2$. It relates particularly to a catalyst for combining CO and $O_2$ to form $CO_2$ in a high-powered, pulsed $CO_2$ laser.

2. Description of the Related Art

In many applications, it is highly desirable, even necessary, to operate a $CO_2$ laser in a sealed condition, for in an open system the laser requires a continuous flow of laser gas to remove the dissociation products,—viz., CO and $O_2$—that occur in the discharge zone of the laser, in order to maintain a stable power output. This adds to the operating cost of the laser, and in airborne or space applications, it also adds to the weight penalty of the laser. In a sealed $CO_2$ laser, a small amount of $CO_2$ gas is decomposed in the electrical discharge zone into corresponding quantities of CO and $O_2$. As the laser continues to operate, the concentration of $CO_2$ decreases, while the concentrations of CO and $O_2$ correspondingly increase. The increasing concentration of $O_2$ reduces laser power, because $O_2$ scavenges electrons in the electrical discharge, thereby causing arcing in the electric discharge and a loss of the energetic electrons required to boost $CO_2$ molecules to lasing energy levels. As a result, laser power decreases rapidly. It is known that the output of a sealed $CO_2$ laser can be enhanced by the addition of a small amount of water vapor to the laser gas. See W.J. Witteman, "The $CO_2$ Laser", Vol. 53. Springer-Verlag (1987), pp. 104–108. However, this is a short-term effect, after which output starts to fall. Additionally, too much water vapor in the gas will decrease the laser output. See W.J. Witteman, "Increasing continuous laser-action on $CO_2$ rotational vibrational transitions through selective depopulation of the lower laser level by means of water vapor," *Physics Letters*, Vol. 18, No. 2, Aug. 15, 1965; and Witteman, W.J., "4B4-Rate determining processes for the production of radiation in high power molecular lasers," *IEEE J. of Quantum Electronics*, Vol. QE-2, No. 9, September 1966.

A catalyst that can combine CO and $O_2$ as soon as formed in the laser envelope would prevent the loss of laser power. To be effective, many catalysts must be heated to elevated temperatures above ambient conditions to efficiently combine the products of $CO_2$ dissociation. This is not feasible in the laser envelope, because the gas in this envelope must be maintained at ambient temperature for efficient operation. This means that the catalyst must be located in a recirculating loop external to the laser; and this requires a pump, a heating system, and a cooling system, all of which can add to operating cost, as well as to weight penalty in airborne or space-borne applications. However, a catalyst effective at ambient operating temperatures can be installed directly in the laser envelope, since the laser gas, comprising $CO_2$, $N_2$, and He, is under high circulation at ambient temperature. Many catalysts require either regeneration or replacement, because they degrade with time and lose their activity for combining the $CO_2$ dissociation products. These requirements not only add to the operating cost and weight penalty of the laser, but also render space-borne applications unfeasible. However, if the ambient-temperature catalyst maintains its activity for long periods of time, a laser can be operated economically in ground-based, airborne, and space-borne applications.

Catalyst formulations of the related prior art consist of (1) a dispersion of colloidal and noncolloidal particles of stannic oxide, either self-supporting or impregnated on an inert support, with a noble metal on the stannic oxide surface (see U.S. Pat. No. 4,524,051) and (2) particles, granules or pellets of stannic oxide with a noble metal on the stannic oxide surface (see European Patent Application No. 83306312.6, dated Oct. 18, 1983).

One of the primary disadvantages of the related prior art is that when the stannic oxide catalyst is in the form of particles, granules, pellets, or supports impregnated with colloidal particles, most of the stannic oxide is below the surface, is structurally bound to other stannic oxide molecules, and is therefore unavailable as active sites. Thus, there is a relatively small surface area of stannic oxide available as active sites for catalytic activity.

Another primary disadvantage of the related prior art is that there is no comprehension of using chemisorbed moisture on a $Pt/SnO_2$ catalyst surface to enhance and prolong its activity.

SUMMARY OF THE INVENTION

It is accordingly the primary object of the present invention to provide what the prior art has been unable to provide, viz., a catalyst which, by composition of matter alone, contains chemisorbed water within and upon its structure, depending upon the treatment conditions to which it is exposed prior to its application, such bound moisture rendering the catalyst highly active and very long-lived, such that only a small quantity of it need be used internally or externally to a sealed or closed-cycle $CO_2$ laser under ambient operating conditions therein for extended time periods, small concentrations of laser dissociation products, viz., CO and $O_2$, being combined to form $CO_2$.

This primary object and other objects and benefits are achieved by the provision of a catalyst which consists essentially of about 1 to 40 percent by weight of one or more platinum group metals (Pt, Pd, Rh, Ir, Ru, Os, platinum being preferred); about 1 to 90 percent by weight of one or more oxides of reducible metals having multiple valence states (such as Sn, Ti, Mn, Cu, and Ce, with $SnO_2$ being preferred); and about 1 to 90 percent by weight of a compound which can bind water to its structure (such as silica gel, calcium chloride, magnesium sulfate, hydrated alumina, and magnesium perchlorate, with silica gel being preferred). Especially beneficial results are obtained when platinum is present in the catalyst composition in an amount of about 5 to 25 (especially 7) percent by weight, $SnO_2$ is present in an amount of about 30 to 40 (especially 40) percent by weight, and silica gel is present in an amount of 45 to 55 (especially 50) percent by weight. This catalyst is ideally suited for application to high-powered, pulsed, $CO_2$ lasers operating in a sealed or closed-cycle condition.

DESCRIPTION OF THE PREFERRED EMBODIMENTS

The composition of this catalyst was suggested by our preliminary experiments in which we discovered the need of a Pt/SnO$_2$ catalyst for bound water to enhance its activity. These experimental results suggested that if the water were bound to the surface, this water would enhance and prolong catalyst activity for long time periods. Since the catalyst is to be exposed to a laser gas mixture, and since a CO$_2$ laser can tolerate only a very small amount of moisture therein, a hygroscopic support for the catalyst would provide the needed H$_2$O into the gas. Of all the hygroscopic materials that would be useful as support materials, silica gel is considered to be superior because of its property to chemisorb water on its surface over a wide range of moisture content. The equilibrium weight percent of water chemisorbed on silica gel ranges from 0 to over 40 percent when exposed to relative humidities of 0 to 100 percent, respectively. Silica gel chemisorption characteristics result from its huge surface area, the highly porous nature of its particles, and its tendency toward hydration. The application of a very thin film of Pt/SnO$_2$ on the silica gel surface preserves a large fraction of this area and hence, control of the moisture content on the catalyst surface is attained.

The catalyst of the present invention may be produced by first preparing a mixture of a commercially available, high-surface-area silica gel and an oxidizing agent. Very beneficial results have been obtained using nitric acid as the oxidizing agent since it leaves no residue. It is also helpful if the silica gel is first deaerated by boiling in water to allow the entire surface to be coated. A metal, such as tin, is then dissolved in the oxidizing agent/support material mixture to yield, in the case of tin, metastannic acid. Although tin has proven especially beneficial for use in a closed-cycle CO$_2$ laser, in general any metal with multiple valence states may be used. The metastannic acid is adsorbed onto the high-surface-area silica gel and coats the surface thereof. Any excess oxidizing agent is then evaporated, and the resulting metastannic acid-coated silica gel is dried, whereby the metastannic acid becomes tin(IV) oxide (SnO$_2$).

The second step is accomplished by preparing an aqueous mixture of the tin(IV) oxide coated silica gel and a soluble, chloride-free salt of at least one platinum group metal. Extremely beneficial results have been obtained using chloride-free salts of platinum, palladium, or a combination thereof, such as tetraamine platinum (II) hydroxide (Pt(NH$_3$)$_4$(OH)$_2$) or tetraamine palladium (II) nitrate (Pd(NH$_3$)$_4$(NO$_3$)$_2$). It is also beneficial if the coated silica gel is first deaerated by boiling. The platinum group metal salt is adsorbed onto the high surface area and coats the surface. A chloride-free reducing agent is then added to the aqueous mixture whereby the platinum group metal is deposited onto the tin (IV) oxide coated silica gel. Any reducing agent which decomposes to volatile produces and water upon reaction or drying is preferred. Formic acid, hydroxylamine (NH$_2$OH), hydrazine (N$_2$H$_4$), and ascorbic acid are particularly advantageous. After the platinum group metal has been deposited onto the tin (IV) oxide coated silica gel, the solution is evaporated to dryness, whereby the desired catalyst is obtained.

Evaluating its performance, we found that the catalyst of the present invention had not only a high activity, i.e., a pumping speed of $3.2 \times 10^{-3} \text{Is}^{-1}\text{g}^{-1}$ under ambient temperature conditions, but also a very long lifetime, exhibiting a half life of eight months. Thus, the purpose of this invention, viz., to formulate a catalyst composition with enhanced activity and long life for sealed CO$_2$ laser applications, has been fulfilled because of the unique composition of this catalyst. An exemplary composition consisting of 6.7% Pt, 39.7% SnO$_2$, and 53.6% silica gel, was tested at 30° C. for a period of 106 days with an activity half life of eight months. The water content of this catalyst was determined to be 12.5%.

The silica gel employed in the instant composition can be in the form of granules, beads, pellets or monoliths. The size and shape of the particles can vary, although a uniform size and shape are desirable properties for good flow distribution through a bed or structure of these particles. The water content of the silica gel has varied up to 27%.

Any other compound which can bind water to its structure can be substituted for silica gel in the instant catalyst composition. Examples of other materials include, but are not limited to calcium chloride, magnesium sulfate, hydrated alumina, and magnesium perchlorate, as well as other metal oxides, hydroxides, salts and their hydrates.

Witteman supra has shown that the introduction of water into the gas phase of a sealed CO$_2$ laser without a hygroscopic catalyst present can increase laser output by approximately 100 percent. However, this output decayed, whereas the hygroscopic properties of the catalyst of the present invention confers a long life at room temperature conditions: a half life of eight months with an initial pumping speed of $3.2 \times 10^{-3} \text{Is}^{-1}\text{g}^{-1}$ without the introduction of moisture in the gas phase. No other catalyst known can compare with this performance. Furthermore, introduction of moisture in the gas phase has been shown to have deleterious effects on the performance of some sealed CO$_2$ lasers.

The present invention has been described in detail with respect to certain preferred embodiments thereof. However, as is understood by those of skill in the art, variations and modifications in this detail can be made without any departure from the spirit and scope of the present invention as defined in the hereto-appended claims.

What is claimed is:

1. A process for the combination of CO and O$_2$ to form CO$_2$ comprising exposing a catalyst consisting essentially of about 1 to 40 percent by weight of a platinum group metal, about 1 to 90 percent by weight of a reducible metal oxide having multiple valence states selected from the group consisting of Sn, Mn, and Cu, and about 1 to 90 percent by weight of a compound which can bind water to its structure selected from the group consisting of silica gel, calcium chloride, magnesium sulfate, hydrated alumina, and magnesium perchlorate, to a CO and O$_2$ gas mixture.

2. A process for the combination of CO and O$_2$ to form CO$_2$ as in claim 1 wherein the CO and O$_2$ gas mixture is contained in a sealed or closed-cycle CO$_2$ laser.

3. A process for the combination of CO and O$_2$ to form CO$_2$ as in claim 1 wherein the platinum group metal is platinum.

4. A process for the combination of CO and O$_2$ as in claim 1 wherein the platinum group metal is platinum, the reducible metal oxide having multiple valence states is SnO$_2$, and the compound which can bind water to its structure is silica gel.

5. A process for the combination of CO and O$_2$ to form CO$_2$ as in claim 4 wherein the platinum is present in an amount of about 5 to 25 percent by weight, the $SnO_2$ is present in an amount of about 30 to 40 percent by weight, and the silica gel is present in an amount of about 45 to 55 percent by weight.

6. A process for the combination of CO and $O_2$ to form $CO_2$ comprising exposing a catalyst consisting essentially of about 7 percent by weight of platinum, about 40 percent by weight of $SnO_2$, and about 50 percent by weight of silica gel to a CO and $O_2$ gas mixture.

7. A process for the combination of CO and $O_2$ to form $CO_2$ comprising exposing a catalyst consisting essentially of about 7 percent by weight of platinum, about 40 percent by weight of $SnO_2$, and about 50 percent by weight of silica gel to a CO and $O_2$ gas mixture contained in a sealed or closed-cycle $CO_2$ laser.

* * * * *